Sept. 23, 1969  L. WINIK ET AL  3,469,026
TV PICKUP AND PROJECTION SYSTEM WITH CAMERA HAVING
FIBER OPTIC HEMISPHERICAL LENS
Filed April 22, 1966  3 Sheets-Sheet 1

INVENTORS
Leon Winik
George Doundoulakis
BY
Nolte & Nolte
Attorneys

Sept. 23, 1969  L. WINIK ET AL  3,469,026
TV PICKUP AND PROJECTION SYSTEM WITH CAMERA HAVING
FIBER OPTIC HEMISPHERICAL LENS
Filed April 22, 1966  3 Sheets-Sheet 2

INVENTORS
Leon Winik
George Doundoulakis
BY
Nolte & Nolte
Attorneys

Sept. 23, 1969     L. WINIK ET AL     3,469,026
TV PICKUP AND PROJECTION SYSTEM WITH CAMERA HAVING
FIBER OPTIC HEMISPHERICAL LENS
Filed April 22, 1966     3 Sheets-Sheet 3

INVENTORS
Leon Winik
George Troundoulakis
BY

United States Patent Office 3,469,026
Patented Sept. 23, 1969

3,469,026
TV PICKUP AND PROJECTION SYSTEM WITH CAMERA HAVING FIBER OPTIC HEMISPHERICAL LENS
Leon Winik, New York, and George Doundoulakis, North Bellmore, N.Y., assignors, by direct and mesne assignments, of fifteen percent to Albert C. Nolte, Jr., Oyster Bay Cove, N.Y.
Filed Apr. 22, 1966, Ser. No. 544,590
Int. Cl. H01j 29/89
U.S. Cl. 178—6.8   11 Claims

ABSTRACT OF THE DISCLOSURE

A fiber optical device wherein the ratio of the core to cladding indices of refraction varies along the optical fiber length and means for providing a television camera system whereby the fiber optic device is utilized as an objective lens.

---

This invention relates to TV pickup and projection systems and more particularly to a TV system using fiber optics for TV pickup of images to be projected on a dome rotunda screen.

The present TV systems are restricted to a relatively small objective angle and the projection of the image occurs on a rather flat or slightly curved surface. In addition the present TV pickup systems provide only a limited depth of focus.

The present invention provides means for a full hemispherical pickup, in focus, regardless of the objects' distance and means for projection of such images on a dome rotunda-like screen.

A viewer, positioned under such a dome rotunda projection screen can envisage a realistic image covering his entire horizon.

An important application of the invention is the projection of actual happenings within a surgical incision during an operation. Heretofore, even the surgeon had but a limited view of the interior of a surgical incision. With the help of the present invention, doctors can be quickly trained by observing the progress of surgical operations closely. In addition trained physicians can also remotely follow the operation and can warn the operating surgeon of a situation of which the surgeon himself could possibly be unaware, because of his limited view. For instance, the formation of air bubbles in the blood vascular system during vascular surgery can, with the present invention, be detected.

It is, therefore, a principal object of the present invention to provide a TV camera system capable of hemispherical coverage and projection onto a hemispherical screen.

Another object of the present invention is to develop a TV pickup means capable of discretely receiving light from a multiplicity of directions, the totality of such multiplicity of directions defining a full hemisphere, whereby by guiding the light from each direction onto corresponding points of a conventional vidicon pickup tube, an image of an entire hemisphere is formed and subsequently projected onto a dome-like screen.

Another object of the present invention is to provide miniature TV pickup means capable of hemispherical coverage.

It is yet another object of the present invention to provide high resolution light pickup means, and low loss light guiding means for accurately focusing a hemispherical image onto a vidicon light sensitive surface.

It is still another object of the present invention to provide proper vidicon and projection tube scanning means which may effectively project a hemispherical image onto a dome rotunda screen.

A further object of this invention is to provide optical pickup means which will be in focus independently of the distance of the object from the objective lens.

The capability of the TV pickup and transmittal system of the invention would also be very desirable in a submarine periscope, for instance, where the naval officers can have simultaneous view of the entire surroundings while sitting comfortably under a dome rotunda projection screen. A similar case exists in viewing the air traffic from an airport observation tower.

With the foregoing and other objects in view, the invention provides a novel means of high resolution light pickup from a desired direction and efficient means for guiding the highly resolved light onto a corresponding point on a vidicon sensitive surface, with appropriate means for scanning the vidicon surface and appropriate means for scanning special projecting means in synchronism with the vidicon scanning means for the TV reproduction of a large angle image. The invention further provides a novel arrangement and combination of elements and in the details of construction, herein after described and claimed, it is to be understood that changes in the precise embodiments of the invention, as herein disclosed, may be made within the scope of the invention as claimed in the appended claims without departing from the spirit of the invention.

Other objects and features of the invention will appear as the description of the particular embodiments selected to illustrate the invention are described.

In the accompanying drawings, which form part of this specification, wherein like characters of reference have been applied to corresponding parts:

Conventional refractive optics cannot provide a hemispherical coverage. Spherical aberration and other optical defects are introduced as the angle of view of the image is widened. It can be easily proved that there is no refractive lens shape, which can focus an entire hemisphere onto a single image. The present invention overcomes the limitations of conventional refractive optics by the use of optical fibers, whose light receiving ends lie on a hemispherical surface. The optical fibers conduct the received light through a curved path and terminate on the sensitive surface of a vidicon tube.

Figure 1:
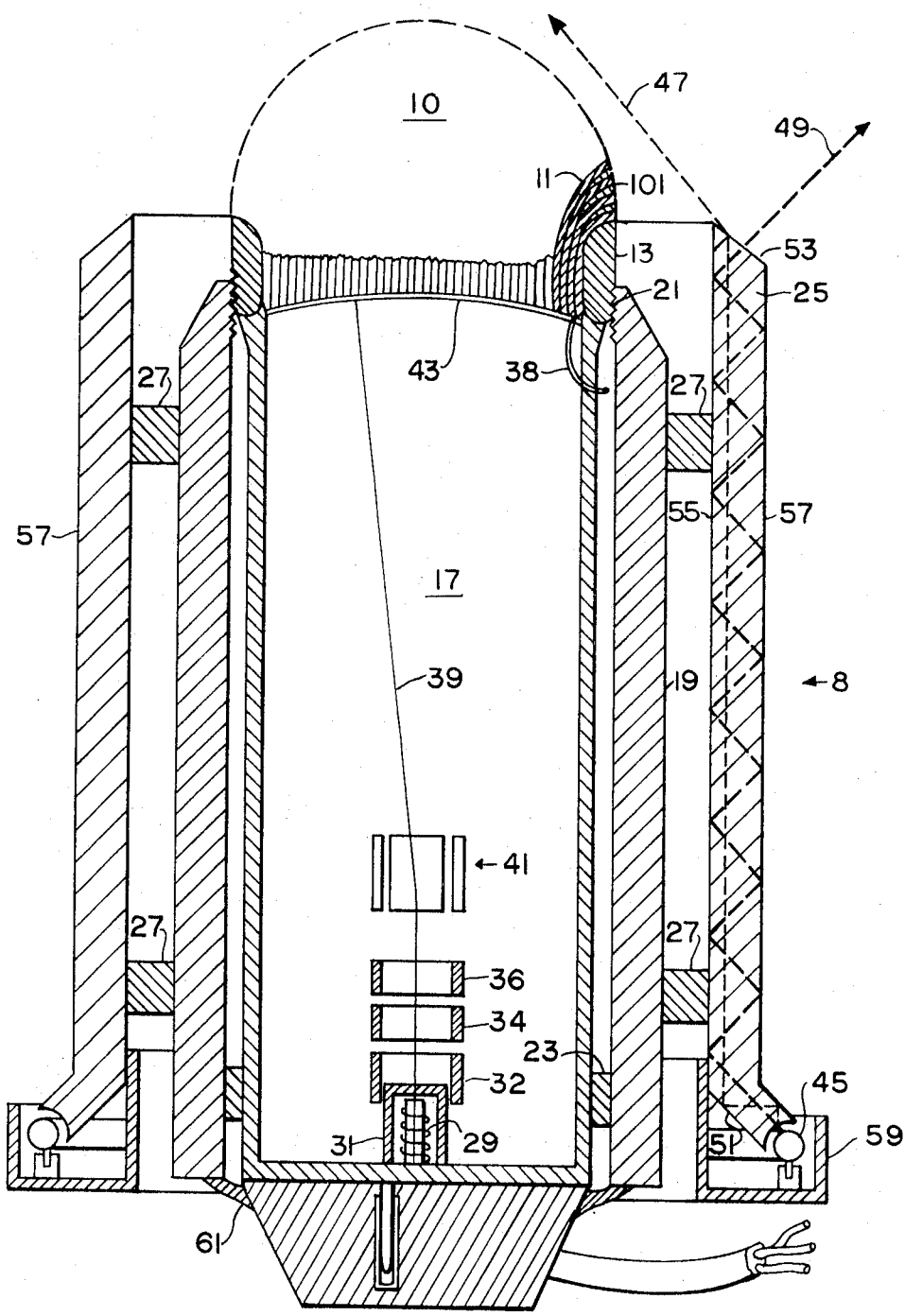
FIG. 1 is a magnified cross sectional elevation view of a TV pickup head in accordance with this invention.

Referring now particularly to FIG. 1, there is shown a pick up head 8 comprising an objective lens 10, made up of a plurality of optical fibers and supported by a ring 13. The ring 13 is attached to a glass envelope of a vidicon pick up tube 17. The assembly of the objective lens 10 and vidicon pickup tube 17 are supported onto a tube 19 by means of a threading 21, and space ring 23. A cylinder 25, made of a transparent, light refractive material is also supported coaxially around the tube 19 through space rings 27. The vidicon tube comprises a heater filament 29 housed within a cylindrical cathode 31. The heated cathode 31 along with electronic focusing elements 33, 35 and 37, commonly referred to as an electron gun assembly, serves to generate and project forward a beam of electrons 39. Two pairs of electrostatic deflection plates 41, serve to deflect the electron beam 39 in two coordinates, to a degree proportional to an electric potential applied between plates 41. A light sensitive surface 43 loses electrons and is charged positively by the light conducted through the optic fibers 11. The electron beam 39 scans the surface 43 and replaces the electronic charge lost between successive scans. An equivalent electronic charge in the form of current is detected to represent the amount of illumination received by the portion of the sensitive surface being scanned. The light received by the optical fibers may be generated by the object itself or may be supplied by any source of light. Pickup head 8 also provides self illumination supplied by a lamp 45. The transparent cylinder 25 serves to conduct light from a lamp 45 to illuminate the object viewed by the lens 10. The two extreme rays 47 and 49, shown in FIG. 1, serve to illustrate the relatively wide angle of illumination which can be achieved by this configuration. Ray 47 is shown to suffer a single reflection on a surface 51 and a single refraction by a surface 53 which directs it in front of the lens 10; while the ray 49 is shown to undergo a plurality of reflections on surfaces 55 and 57 and finally to emerge in a direction away from the objective lens 10. The transparent cylinder 25 may be made of a transparent acrylic such as plexiglass, or for even greater refractive efficiency it may be made in whole or in part from a highly refractive glass such as flint glass. A cover 59 serves to protect the lamp 45 and also serves as a shade. A rubber seal 61 serves as dust cover to the glass envelope 15 of vidicon 17.

FIG. 1 shows the sensitive surface 43 of the vidicon 17 as being applied directly to the surface defined by the extremities of the optic fibers 11 for greater light efficiency and to eliminate parallax which would be introduced by an additional glass cover between the optical fibers 11 and vidicon 17.

The optic fibers 11 are of novel construction for both high resolution, high transmittance and low cross talk between fibers.

Figure 2:
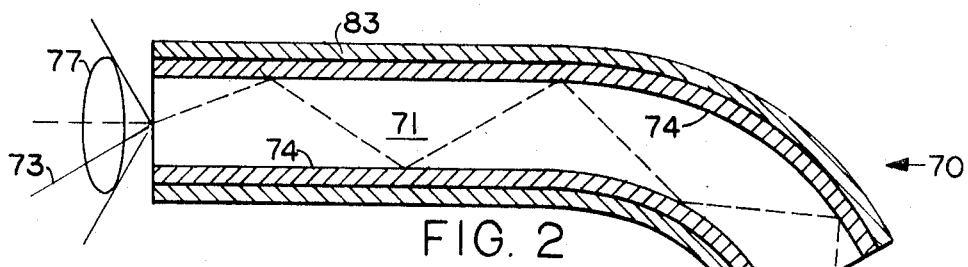
FIG. 2 is a cross sectional schematic diagram of an optic fiber illustrating main features and the principles employed in the transmission of light through curved paths in the fiber.

FIG. 2 shows a typical optic fiber 70 comprising a core 71 made of a transparent material such as glass of refractive index $n_g$ approximately 1.7, covered by a material of lower refractive index $n_c$ approximately 1.5, usually referred to as "cladding."

A light ray 73 is shown to undergo a plurality of internal reflections on the interface 74 before it emerges as shown by an arrow 75. The light ray 73 undergoes total internal reflection as long as the angle of incidence exceeds the critical angle $\theta_c$ of the optic fiber where $$\theta_c = \arcsin \frac{n_c}{n_g} \quad (1)$$

Equation (1) implies that greater angles of bending of the optic fibers are permitted for larger values of the ratio of the refractive indices $n_c$ and $n_g$.

A large difference between the refractive indices of core and cladding, however, would increase the angle of the cone of light acceptance 77 and therefore would restrict the optical resolution of the system. Mathematically the maximum angle at which an optic fiber can receive light is given by the equation $$\theta_{max} = \arcsin \sqrt{n_g^2 - n_c^2} \quad (2)$$

$\theta_{max}$ is also referred to as the nominal aperture of an optic fiber. In fact the equivalent $f$ number of an optic fiber (focal length divided by the diameter of the lens) is given by the equation $$f = \frac{1}{2\sqrt{n_g^2 - n_c^2}} \quad (3)$$

A large difference in the indices of core material and cladding material, therefore results in the acceptance and transmission of stray light rays defined by a cone 79, outside the pure image cone 81.

The present invention accomplishes simultaneously a small numerical aperture, corresponding to a high optical resolution, together with a small critical angle, $\theta_c$ corresponding to low transmission loss, higher isolation between fibers (lower cross talk between fibers) and greater bending capability by employing different index of cladding material at different segments along the optic fibers.

It is also customary to apply a second coating 83 around the fibers referred to as E.M.C. (extra mural cladding) or E.M.A. (extra mural absorption). The E.M.A. coating serves to absorb large angle rays and therefore increases resolution and lowers cross talk between fibers.

Figure 3:
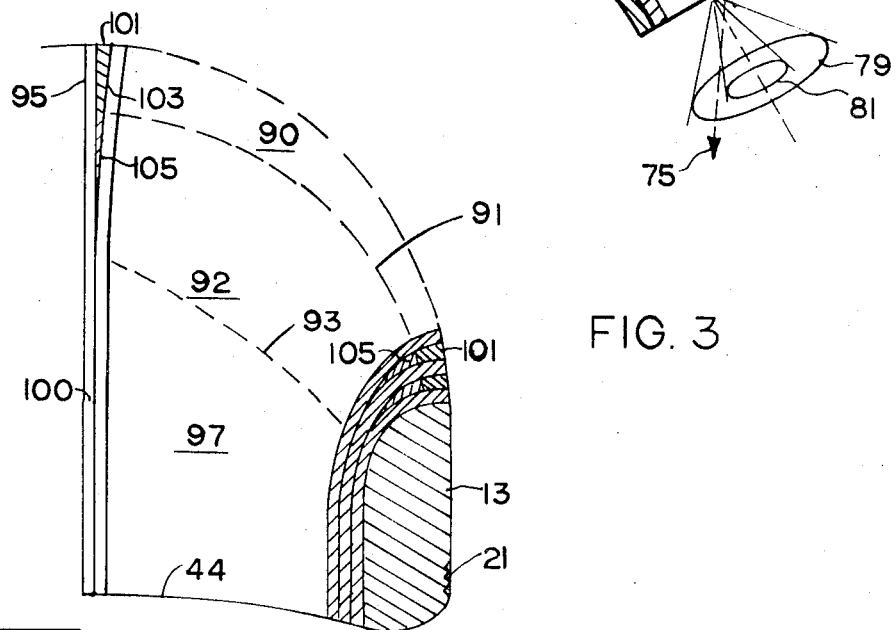
FIG. 3 is a cross sectional detailed elevation view of the optical fiber objective lens which is a part of the pick up head shown in FIG. 1.

FIG. 3, which shows a portion of the optic fiber objective lens in greater detail, illustrates the difference in the coating of optic fiber core from the surface of the objective lens 10, along the length of the fiber, to the end of the fiber at the light sensitive surface 43 of vidicon 17.

The objective lens 10 is divided into three regions. The first region 90 extending from the surface of the lens 10 to plane 91 may be called the "directive region" since it serves to increase the directivity of the light absorption. The second region extends between the planes 91 and 93 and may be called the "curved region" since it serves to bend the rays from the various angles of incidence into a single direction, parallel to the center optic fiber 95. The third region 97 extending between the plane 93 and sensitive surface 44 may be called the "linear region" since the optic fibers remain essentially straight.

In the directive region 90 the optic fibers 11 are kept straight and along the radius joining the center of the hemisphere 100 (defined by the outer surface of the lens 10), and the outer tip of the particular optic fiber. The fiber in the directive region, therefore, points exactly towards the direction which it is supposed to observe. In the directive region, 90 the cladding 101 of the optic fibers 11 consists of a material of refractive index very nearly that of the core. This implies small angle of acceptance and therefore high directivity of the fiber. E.M.A. 103 serves to absorb all large angle rays. Since the optic fibers in region 90 are straight, no loss occurs in the useful light arriving from the direction at which the fiber is pointed. The light reaching the second region 92 is useful light and must be preserved. Since the bending of the fibers occurs in this second region 92, a large difference, $n_g - n_c$, is needed to insure low loss and low cross talk. For this reason, a low refractive index cladding material 105 is employed. E.M.A. may only be needed at the outer part of lens 10, away from the center fiber 95, where larger angles of bending are needed. In the third region 97 where the fibers are kept straight, no coating is needed and the optic fibers may consist only of core material.

The coatings are applied during the fabrication of the lens. During fabrication the lens starts with the ring 13 which is sealed with the glass envelope at a later stage. The optic fiber core is wound around the ring, layer by layer, in a similar manner that wire is wound around magnetic toroidal cores. After each layer, the cladding and E.M.A. coatings are painted on each core layer. When the winding of lens is completed it looks like a completely wound toroid.

Subsequent to the winding and after the hardening of the coatings, the hemispherical surface and the surface 44 are cut. The fibers outside these two surfaces are discarded. The surface 44 of the objective lens 10 is then coated by a light sensitive material. The lens 10 is ready to be attached and sealed to the vidicon glass envelope prior to the evacuation of the glass envelope of vidicon 17.

Figure 4:
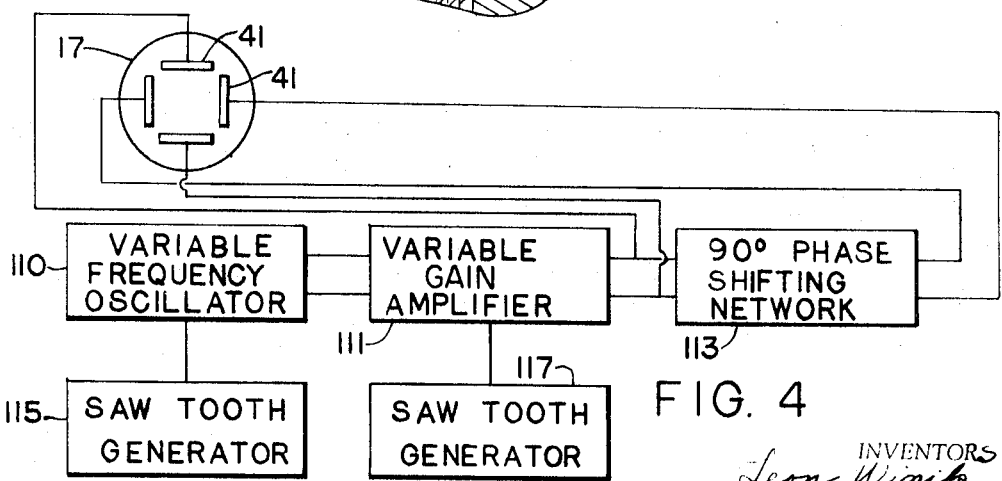
FIG. 4 is a schematic block diagram showing the electronic circuitry used to supply appropriate scanning signals for the image pick up and image projection means.

FIG. 4 illustrates schematically the electronic blocks employed for the generation of helical scanning signals in both the vidicon 17 and the special tube used for projecting the image. Helical scanning has in the past been employed in certain types of radar. The electronic blocks shown in FIG. 4 are therefore conventional, and known to those versed in the art. Only minor modifications are required as to the rates of scanning in order for the projected image to be properly proportioned on the screen.

Referring now to FIG. 4, a variable frequency oscillator 110 is connected to a variable gain amplifier 111 and a sawtooth generator 115. The variable gain amplifier 111 is, in turn connected to a second sawtooth generator 117 and a 90° phase shifting network 113, the output of which drives one of the pairs of electrostatic deflection plates 41 of the vidicon 17; while the output signal from the variable gain amplifier 111 feeds the other pair of electrostatic deflection plates 41 of the vidicon 17. The oscillator 110 generates a sinusoidal wave the frequency of which can be electronically changed by the output signal of the sawtooth generator 115. As the signal of the generator 115 increases the output frequency of oscillator 110 also increases. If the output of oscillator 110 is applied to one pair of plates 41, the locus of incidence of the electrons of the electron bear 39 on the sensitive surface 43 of the vidicon 17 would be a straight line. But when the same signal is shifted in phase by 90° and is applied to the other pair of plates 41 the locus of incidence of the electrons becomes a circle. The frequency of the oscillator 110 determines how many times per second the electron beam 39 describes such a circle. The introduction of the output of sawtooth generator 115 would cause the frequency to change linearly with time. The variable gain amplifier 111 causes the amplitude of the signal and therefore the radius of said circle to vary, and since the gain of the amplifier 111 varies linearly with time, the size of the circle is caused to vary linearly with time. As the signal from the sawtooth generator 117 is varied from zero to a maximum value, the size of the circle varies from zero, at the center of the vidicon 17, to a maximum sized circle along the rim of the sensitive surface 43. It is to be noted that the sawtooth generators 115 and 117 operate out of phase so that while the signal output of the sawtooth generator 115 is decreasing the signal of the sawtooth generator 117 is increasing.

The electronic beam 39 starts at the center of the vidicon 17 while the generator 115 supplies maximum signal. The frequency of circles is therefore high. At this time the generator 117 supplies minimum value signal to the amplifier 111 and therefore the radii of the circles are small. As the signal from the generator 117 increases the radii of the circles increase so that the beam actually describes a helix on the sensitive surface 43. As the radii of the circles increase the frequency decreases so that the linear velocity of the electronic beam on the sensitive surface 43 remains constant.

Figure 5:
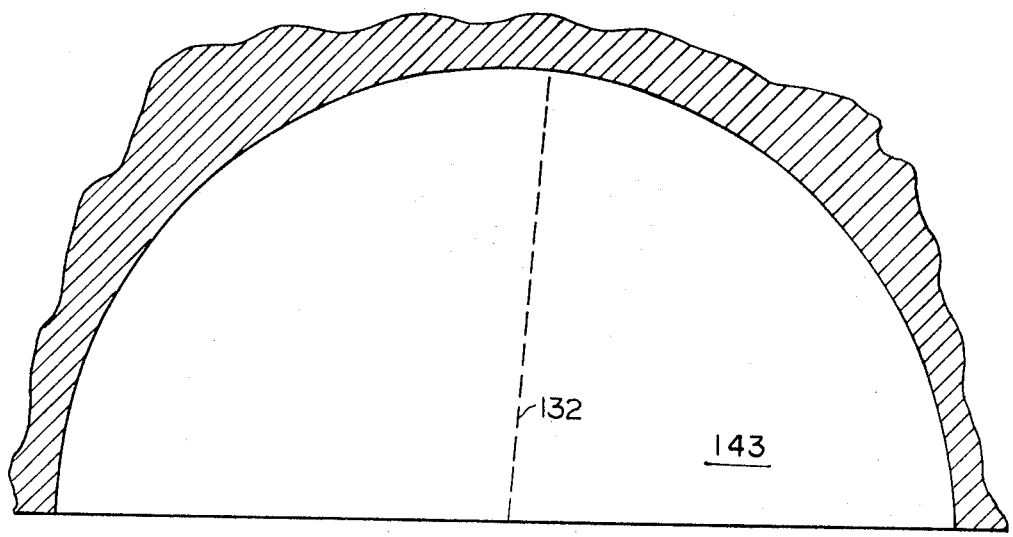
FIG. 5 is a cross sectional elevation view of the projection system in relation to a dome-like screen.
Figure 5:
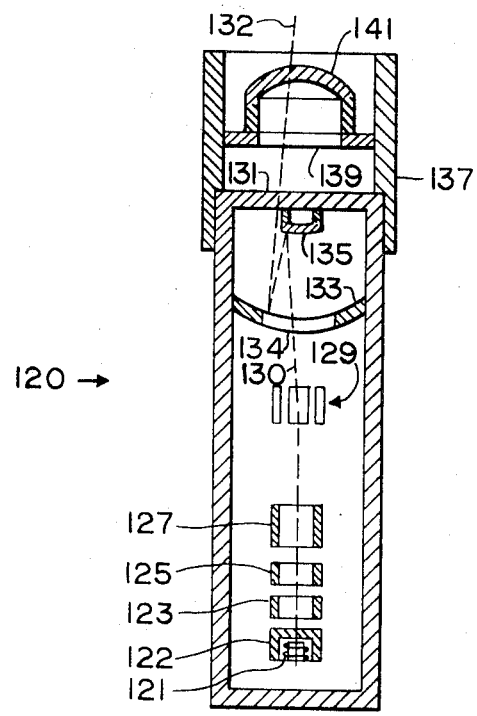

For projetion of the image formed on the vidicon sensitive surface 43, FIG. 5 shows a Schmidt mirror optical system comprising a conventional Schmidt mirror optical projector 120 and a dome like screen 143.

Referring to FIG. 5, there is shown an electron gun comprising a cathode 122, a heater filament 121 which heats the cathode 122 and increases the energy of electrons in the cathode, and electron optical elements 123, 125 and 127 for accelerating and focusing the electrons boiled out from the cathode 122 into an electron beam 130, towards two pairs of deflection plates 129. The electron beam 130 is deflected by the pairs of deflection plates 129 to pass through an aperture 134 and strike a phosphor coated surface 135 where the kinetic energy of the electron is transformed into light energy. The light emitted by the phosphor surface 135 is focused by a mirror 133 through the glass cover 131 and correction lens 141 onto a dome shaped screen 143.

The electronic scanning of the projection tube 120 is similar to that of the vidicon 17 already described in conjunction with FIG. 4. A predetermined curvature may be introduced in the output signal of the sawtooth generator 117 to compensate for the curvature of the dome, as seen by the observer.

What we claim is:
1. In a television pickup head an objective lens, having a substantially hemispherical light incident surface and a light emergent surface spaced rearwardly thereof along the optical axis of said lens, said objective lens being separated into a multiplicity of light directive sections, internally of said light incident surface, means for selecting the light incident on each of the directive sections through a small optical angle and discarding rays incident through a large optical angle means for guiding the selected light incident on said surface substantially throughout 90° thereof in all radial directions relative to the optical axis of said lens into paths parallel to said optical axis to the light emergent surface of said lens, onto a television pickup tube light sensitive surface.

2. In a television pickup head, a hemispherical objective lens, comprising a multiplicity of optic fibers, extending from the surface of said objective lens to a light sensitive surface, said optic fibers acting as light directive sections, each of said optic fibers selecting the light incident thereon through a small optical angle and discarding rays incident thereon through a large optical angle, said optic fibers guiding said selected light through a curved path, said fibers extending through three regions, one region near the surface of said objective lens where said optic fibers are kept straight and are coated by a cladding material having an index of refraction close to the index of refraction of the optic fiber core material, and an extra mural absorption coating over the cladding material coating for absorption of unwanted large angle rays, a second region wherein said optic fibers are bent and are coated by a cladding material of an index of refraction less than the index of refraction of the optic fiber core, and a third region wherein said optic fibers are kept straight, and means for focusing said selected light onto a television pickup tube light sensitive surface in a definite relation to the direction of incidence onto said objective lens.

3. The combination as recited in claim 2, wherein the optic fibers in said third region are uncoated.

4. The combination of claim 2 further comprising means for illuminating the object viewed by said objective lens.

5. The combination of claim 2 further comprising electronic means for helically scanning said television pickup tube said scanning means further comprising means for varying the frequency of cyclic revolutions in an inverse proportion to the radius of the circle being scanned.

6. A television system for pickup and projection of images extending substantially over an entire herisphere comprising an optic fiber objective lens, optic fiber means for dividing said objective lens into a plurality of directive sectors, each sector receiving light from the direction defined by the radius to the point of the hemisphere where said optic fiber begins, a short straight section of optic fiber core coated with cladding of equal index of refraction and extra mural absorption along said radius, a curved section of optic fiber coated with cladding of smaller index of refraction than the core, a television pickup tube to receive the light conducted by said optic fiber means and means for projecting the image received by said television pickup tube.

7. The system of claim 6 wherein said television pickup tube and said projection means are scanned in a helical sense.

8. The system of claim 6 further comprising a dome like projection screen onto which the image is projected by said projecting means.

9. The system of claim 6 wherein said projection means comprise a Schmidt mirror optical projector.

10. An image pickup and projection system comprising a television system for pickup and projection of images extending substantially over an entire hemisphere comprising an optic fiber objective lens, optic fiber means for dividing said objective lens into a plurality of directive sectors, each sector receiving light from the direction defined by the radius to the point of the hemisphere where said optic fiber begins, a short straight section of optic fiber core coated with cladding of equal index of refraction and extra mural absorption along said radius, a curved section of optic fiber coated with cladding of smaller index of refraction than the core, a television pickup tube to receive the light conducted by said optic fiber means, a substantially hemispherical screen remotely located from said pickup means and means for transmitting the image received by said objective lens to said remote screen.

11. The system of claim 10 wherein said pickup means is a pencil shaped miniature television camera.

References Cited

UNITED STATES PATENTS

| | | | |
|---|---|---|---|
| 2,877,368 | 3/1959 | Sheldon | 178—6.8 X |
| 2,932,294 | 4/1960 | Fourestier et al. | 128—6 |
| 2,995,970 | 8/1961 | Hicks et al. | 65—4 |
| 3,033,071 | 5/1962 | Hicks | 65—4 X |
| 3,132,646 | 5/1964 | Hett | 128—6 |
| 3,175,037 | 3/1965 | Padgitt | 178—7.85 |
| 3,275,743 | 9/1966 | Conant | 178—6.8 X |

OTHER REFERENCES

Book: Encyclopedia on Cathode-Ray Oscilloscopes and Their Uses, pp. 7–74 to 7–76, by: John F. Rider and Seymore D. Uslan published by: John F. Rider publisher, Inc., received in Patent Office Mar. 2, 1964.

ROBERT L. GRIFFIN, Primary Examiner

R. K. ECKERT, JR., Assistant Examiner

U.S. Cl. X.R.

65—4; 178—7.85; 350—96